United States Patent [19]

Huang

[11] Patent Number: 4,951,984

[45] Date of Patent: Aug. 28, 1990

[54] DOOR CATCH

[76] Inventor: Chao-Ming Huang, No. 104, Hai Tien Road, Tainan, Taiwan

[21] Appl. No.: 370,714

[22] Filed: Jun. 23, 1989

[51] Int. Cl.[5] .............................................. F16F 1/36

[52] U.S. Cl. .................................... 292/76; 16/86 A; 297/DIG. 38; 297/DIG. 19

[58] Field of Search ............................ 16/86 A, 86 R; 292/DIG. 19, 80, 76, 87, DIG. 38

[56] References Cited

U.S. PATENT DOCUMENTS 1,889,681 11/1932 Marshall et al. .................. 16/86 A 3,864,785 2/1975 Hoppock ........................... 16/86 A

*Primary Examiner*—Richard K. Seidel

*Assistant Examiner*—Carmine Cuda

*Attorney, Agent, or Firm*—Morton J. Rosenberg; David I. Klein

[57] ABSTRACT

This invention relates to an improved door catch and in particular to one utilizing an integrally formed door catch to catch a door knob by pushing a door backward, the knob of the door will push the elastic door catch upward and when the knob has passed through the hook of the catch and the door catch will, because of its elastic force, return to its original position and hook the knob thus the door is held at a fixed place.

2 Claims, 8 Drawing Sheets a – a

DOOR CATCH

BACKGROUND OF THE INVENTION

Known prior art door catches are shown in FIGS. 7 and 8. FIGS. 7 and 8 provide for known prior art systems by the Applicant and are believed to be the most popular type of door catches. Referring to FIG. 7, such prior art system includes a pair of elastic clips 83 which capture a striker 85 when such is inserted therebetween. The other type of popular door catch is shown in FIG. 8 where a magnet 94 is attached to the striker 93 and attracts a magnetic plate 92 formed on the base 91 of such systems.

In referring to the prior art system shown in FIG. 7, it is seen that the base 81 is secured or otherwise adapted to be mounted to a wall where the elastic clips 83 are secured to the base 81 through the pin members 82. In general, such prior art systems include elastic clips 83 having a pair of rollers 84 to roll on and interface with the striker 85 which is generally formed in an arrowhead configuration on one end, as is shown. When the door is displaced, the striker 85 forces the elastic clips 83 to be opposingly displaced and open in order to allow the striker 85 to slide therein. Simultaneously, the rollers 84 reduce the friction of the striker 85 and the clips 83 by rolling over the exterior surface of a portion of the striker 85.

In the operation of prior art systems such as that shown in FIG. 8, the base 91 generally has one end fixed or adapted to be mounted to a wall and the other end has a magnetic plate 92. The striker 93 has a magnetic ball 94 formed on one end and when the door is displaced, will allow attraction between the magnetic plate 92 and the magnet material 94 to allow the door member to be fixed in an open position.

However, both of the prior art systems shown in FIGS. 7 and 8 are believed to have a number of disadvantages in that it is inconvenient with the multiplicity of pieces forming both of each said prior systems to install one to the wall and the other to the door member. Additionally, such are formed in a complex manner and increase the manufacturing costs of a door catcher. It is noted that each of the components, such as the base 81, the elastic clips 83, the rollers 84 and the strikers 85 have to be produced separately and assembled which increases both the labor costs as well as inventory costs, and further, manufacturing costs.

In view of such prior art systems, the Applicant has invented the improved door catch system which is integrally formed in one-piece formation and which is believed to be both inexpensive and convenient in installation.

SUMMARY OF THE INVENTION

A one-piece integral door catch which includes a base member adapted to be mounted to a base surface. The base member has an opening formed therein for at least partial insertion of a portion of a doorknob. The base member has a pair of openings formed therethrough for passage therethrough of a pair of fastening elements providing the mounting of the base member to the base surface. An elastic hook member is formed in a one-piece integral manner with the base member and extends therefrom. The elastic hook member forms a protuberance for passage over a doorknob. The elastic hook member has an inclined leading edge for displacing said leading edge when said hook member leading edge is contacted by said doorknob. The elastic hook member has a lower arcuate surface which interfaces with the inclined leading edge for elastically capturing the doorknob when such is in an open position.

It is the primary object of the present invention to provide an improved door catch which is formed in a one-piece integral manner and therefore is convenient to manufacture and assemble.

It is another object of the present invention to provide an improved door catch which reduces the friction of pulling and pushing the door from a closed to an open position in a reversible manner.

It is still another object of the present invention to provide an improved door catch which is simple to install.

It is still another object of the present invention to provide an improved door catch which is easy to operate.

It is a further object of the present invention to provide an improved door catch which corresponds with a cost effective manufacturing process.

DESCRIPTION OF THE PREFERRED EMBODIMENTS

Figure 1:
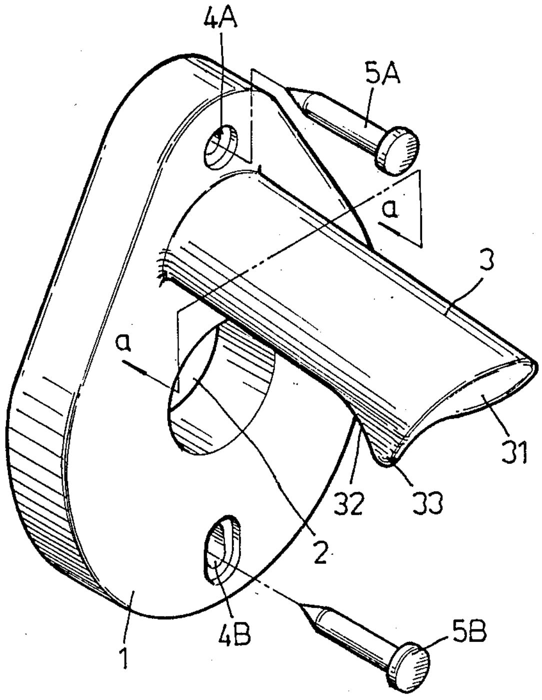
FIG. 1 is a perspective view, partially exploded, of the present invention system.
Figure 1A:
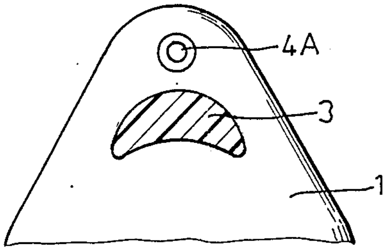
FIG. 1A is a cross-sectional view of the improved door catch system taken along the Section Lines a—a of FIG. 1.
Figure 2:
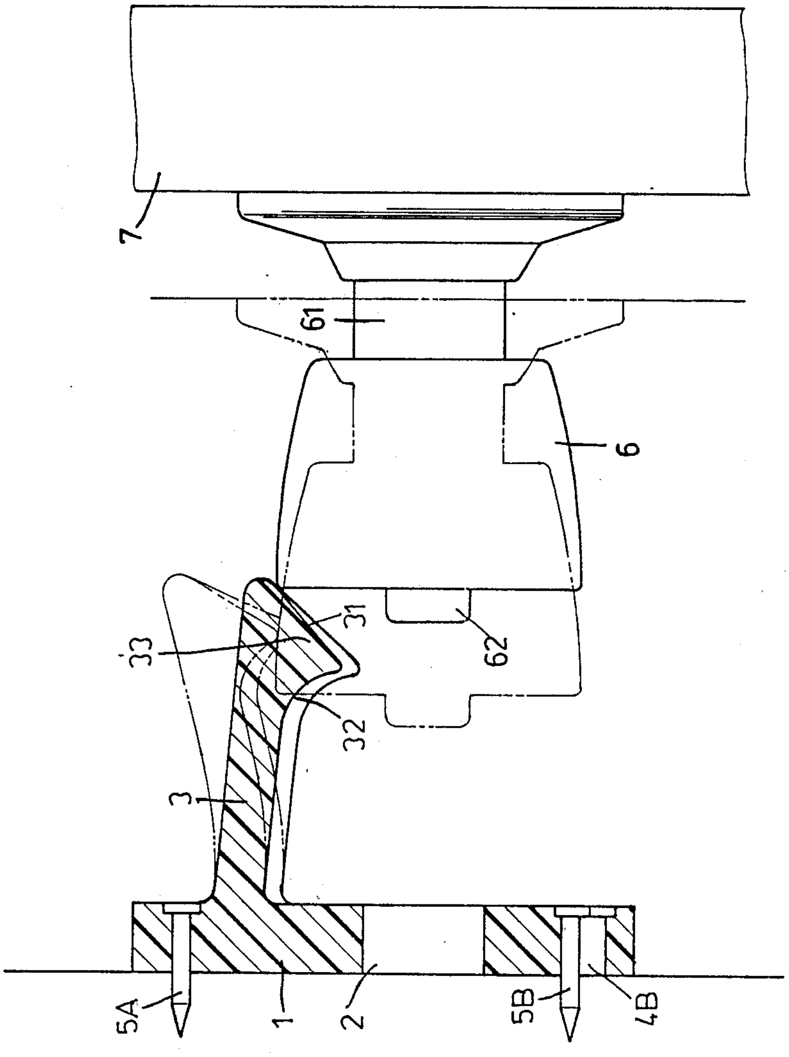
FIG. 2 is an elevational view partially in cross-section, showing the improved door catch system in both an open and a closed condition.
Figure 3:
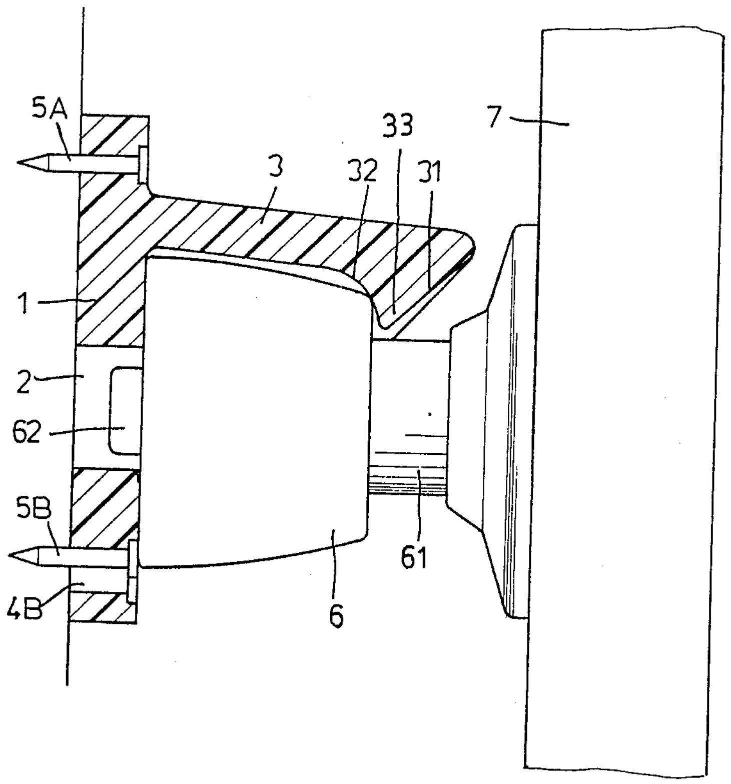
FIG. 3 is an elevational view of the subject improved door catch system showing the elastic hook member being mounted over the doorknob.

Referring now to FIGS. 1–3, there is shown the improved door catch system formed in accordance with the present invention concept. The improved door catch system includes a one-piece integrally formed base 1 which has a hole or opening 2 substantially located at the center of the base 1. An elastic hook 3 extends from the base 1 and extends away from the substantially planar base 1 and is further located above opening or hole 2 as is clearly seen in FIGS. 2 and 3.

A pair of screw openings 4A and 4B are formed through base 1 as is shown in FIGS. 2 and 3. Threaded members or screws 5A and 5B pass through openings or screw holes 4A and 4B for attachment to a base surface, as is clearly seen in FIGS. 2 and 3. It is noted that screw hole 4B is extended in a vertical direction which allows for adjustability, as will be shown in following paragraphs.

Elastic hook 3 has a leading edge 31 which is inclined and a lower arcuate surface 32 which interfaces with leading edge 31 to form protuberance 33 at a front end, as is seen in FIGS. 2 and 3.

In operation, for an installation, initially the threaded member or screw 5B is inserted through the opening or hole 4B and the base member 1 may be adjusted in a vertical direction. When the location is correctly provided, the threaded member or screw 5A is threaded into the hole or opening 4A in a secure manner. Finally, the threaded member or screw 5B is tightened within the hole 4B to allow mounting of base member 1 to the base surface.

Referring now to FIG. 2, such shows the doorknob 6 being pushed in a backward manner towards the elastic hook 3 of the present invention concept. As can be seen, when the top edge of the doorknob head 6 touches the leading inclined edge 31 of the elastic hook 3, due to the elastic characteristics of the elastic hook 3, the hook 3 is forced upwardly or displaced by the pushing force of the doorknob 6 and when the doorknob 6 passes through the leading edge 31, the protuberance 33 of the elastic hook 3 then falls onto the neck 61 of the doorknob 6 and captures the doorknob 6 and the attached door in an open position.

The composition of the elastic hook 3 and the base member 1 may be one of a number of elastic materials which are in general referred to as polyurethane elastomers. One such type commercially available has a Trademark name Hytrel and is manufactured by DuPont of Wilmington, Del.

The doorknob head 6 may include the push button 62 and when the door is opened and the elastic hook 3 is mounted within the neck 61 of the doorknob, the push button 62 may be at least partially inserted into the opening or hole 2 in order to prevent the push button 62 to be pressed in an inward manner so that the door will not be accidentally locked when the door is then closed. Insert of the push button 62 within the opening 2 is clearly seen in FIG. 3. Thus, when a user wishes to close the door, it is only necessary to pull the doorknob 6 and the elastic hook 3 will be moved or displaced in an upward manner and the knob head 6 slides through the plastic hook 3 and the door is free to be closed.

Figure 4:
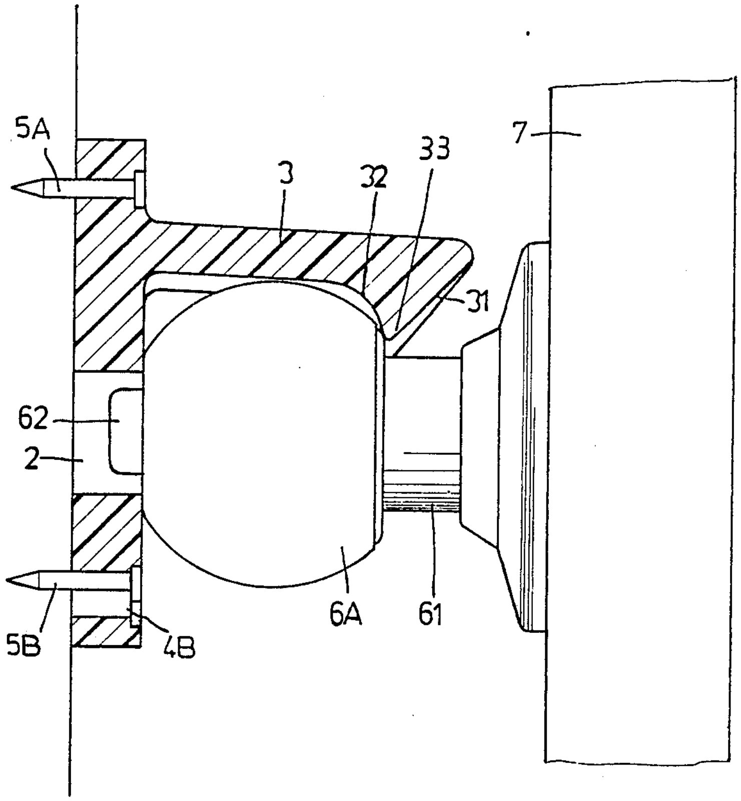
FIG. 4 is an elevational view, partially in cross-section, showing a first embodiment of the improved door catch system.

Referring now to FIG. 4, there is shown another type of knob head 6A which is differently contoured than the knob head 6 as previously described, but in relation to the improved door catch, operates in the same manner. It is noted that doorknobs independent of the shapes have lengths which comply with international specifications within specified limits and thus, the improved door catch as provided in this invention concept is dimensioned to fit all of such differing shaped knob heads. Additionally, the protuberance 33 of the elastic hook 3 having the material as previously specified is not easily worn out over long periods of use, and thus, provides for an extended life of the improved door catch system, as herein presented.

Figure 5:
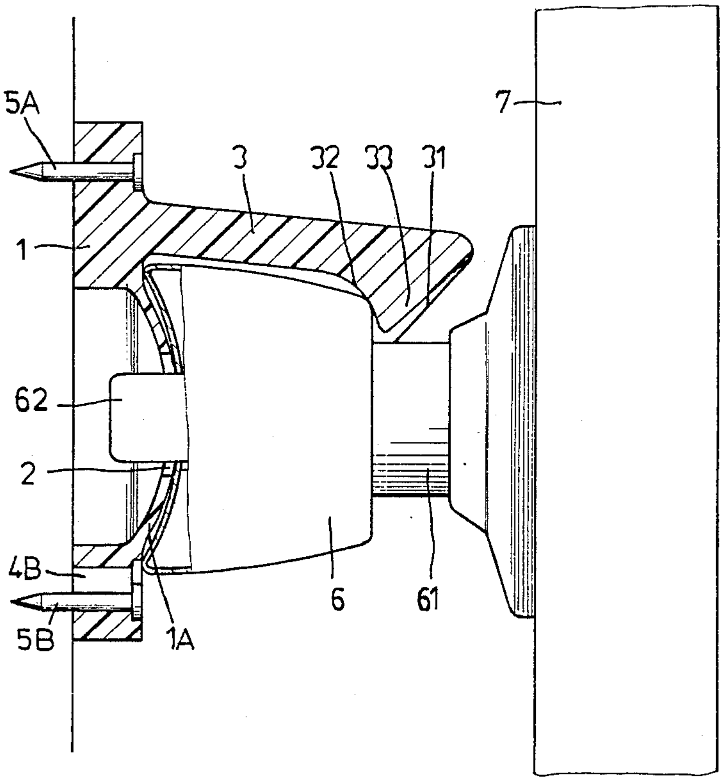
FIG. 5 is an elevational view partially in cross-section, showing a second embodiment of the improved door catch system.
Figure 6:
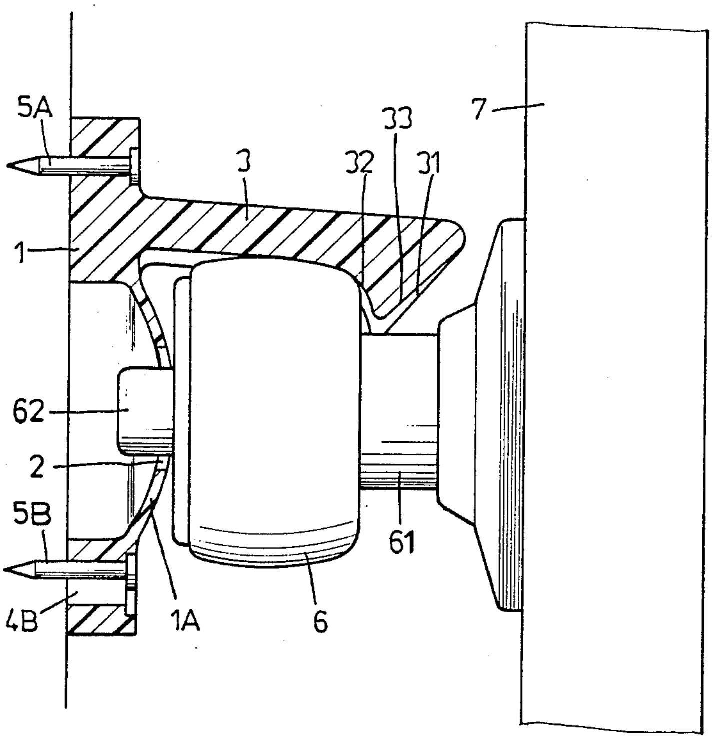
FIG. 6 is an elevational view, partially in cross-section, showing a third embodiment of the improved door catch system.
Figure 7:
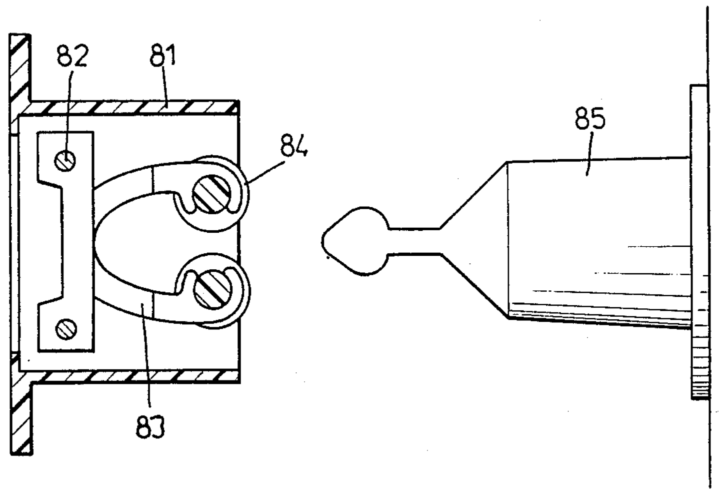
FIG.7 PRIOR ART
FIG. 7 is an elevational view of a prior art door catch system.
Figure 8:
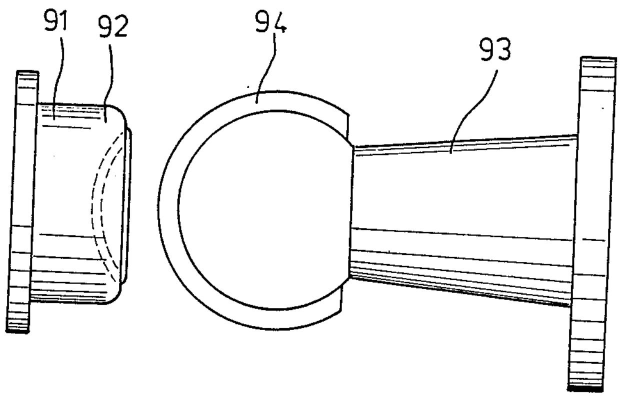
FIG.8 PRIOR ART
FIG. 8 is an elevational view of a second prior art door catch system.

Referring to FIG. 5, there is shown another embodiment of the present invention which shows an arcuate shell or bulge portion 1A formed at the center of the base 1 with the back side of the arcuate and elastic bulge portion 1A having been removed to form a shell so that the element 1A is elastic. When the door is pushed in a backward manner, the doorknob 6 will push the arcuate shell portion 1A backward and when the door is pulled forward, the arcuate portion 1A will return to its original position.

The hole or opening 2 formed at the center of the bulge portion 1A is provided in order that the push button 62 will stay in the hole or opening 2 when the door is pushed backward and is captured by the elastic hook 3. When the door is pushed in a backward manner and the knob head 6 touches the arcuate or bulge portion 1A, the front surface of the knob head 6 will touch the bulge portion 1A. The arcuate or bulge portion 1A due to its elastic characteristic will be displaced in a backward manner. When the bulge portion touches the knob head 6, such pushes the knob outwardly because of its elastic force, and simultaneously the neck 61 of the knob 6 is hooked or captured by the hook 3 and the elastic nature of the portion 1A enhances the ability of the hook 3 to capture or hook the door in an open position.

In the event that the knob head 6 is shorter than a predetermined distance, the arcuate or bulge portion 1A may be only pushed or displaced by a slight amount by the knob 6, however, the hook 3 will still capture the door tightly. In this manner, the shapes or sizes of the knob head are independent as to operation of the improved door catch, and the invention concept allows for operation at all times.

I claim:

1. A one-piece integral door catch comprising:

(a) a base member adapted to be mounted to a base surface, said base member having an opening formed therein for at least partial insertion of a portion of a doorknob, said base member having a pair of openings formed therethrough for passage therethrough of a pair of fastening elements providing said mounting of said base member to said base surface; and, (b) an elastic hook member formed in a one-piece integral manner with said base member and extends therefrom, said elastic hook member forming a protuberance for passage over a doorknob, said elastic hook member having an inclined leading edge for displacing said protuberance when said hook member leading edge is contacted by said doorknob, said elastic hook member having a lower arcuate surface interfacing with said inclined leading edge for elastically capturing said doorknob.

2. The one-piece integral door catch as recited in claim 1 where said base member includes an arcuate and elastic portion having said opening formed therethrough for insertion thereof of a push button member of said doorknob, said arcuate and elastic portion defining a shell section for providing elasticity to said arcuate portion.

* * * * *